United States Patent [19]

Bays

[11] 4,219,950
[45] Sep. 2, 1980

[54] DEVICE FOR POSITIONING A PATTERN STRIP CHART

[76] Inventor: Caroline Bays, Rte. 5, Box 1140-F, Shady Pine Rd., Klamath Falls, Oreg. 97601

[21] Appl. No.: 912,172

[22] Filed: Jun. 5, 1978

[51] Int. Cl.³ .............................................. G09F 11/18
[52] U.S. Cl. ..................................................... 40/518
[58] Field of Search ....................... 40/518; 35/15, 76; 281/7

[56] References Cited

U.S. PATENT DOCUMENTS

| 532,569 | 1/1895 | Leffingwell | 40/518 |
| 557,024 | 3/1896 | Richard | 40/518 |
| 560,204 | 5/1896 | Gamble | 281/7 |
| 770,841 | 9/1904 | Barker | 40/518 |
| 778,092 | 12/1904 | Willson | 40/518 |
| 2,551,298 | 5/1951 | Smith | 281/7 |
| 4,091,552 | 5/1978 | Dickerson | 40/518 |

FOREIGN PATENT DOCUMENTS 8749 of 1892 United Kingdom ...................... 40/518

Primary Examiner—Louis G. Mancene
Assistant Examiner—Wenceslao J. Contreras
Attorney, Agent, or Firm—James D. Givnan, Jr.

[57] ABSTRACT

A main body of the device includes an elongate opening for chart display. Manually operable spindles carry the chart. Locks serve to prevent accidental spindle rotation and include latching elements engageable with spindle mounted members in any one of a multitude of spindle positions to permit precise display of that chart segment of immediate interest.

1 Claim, 7 Drawing Figures

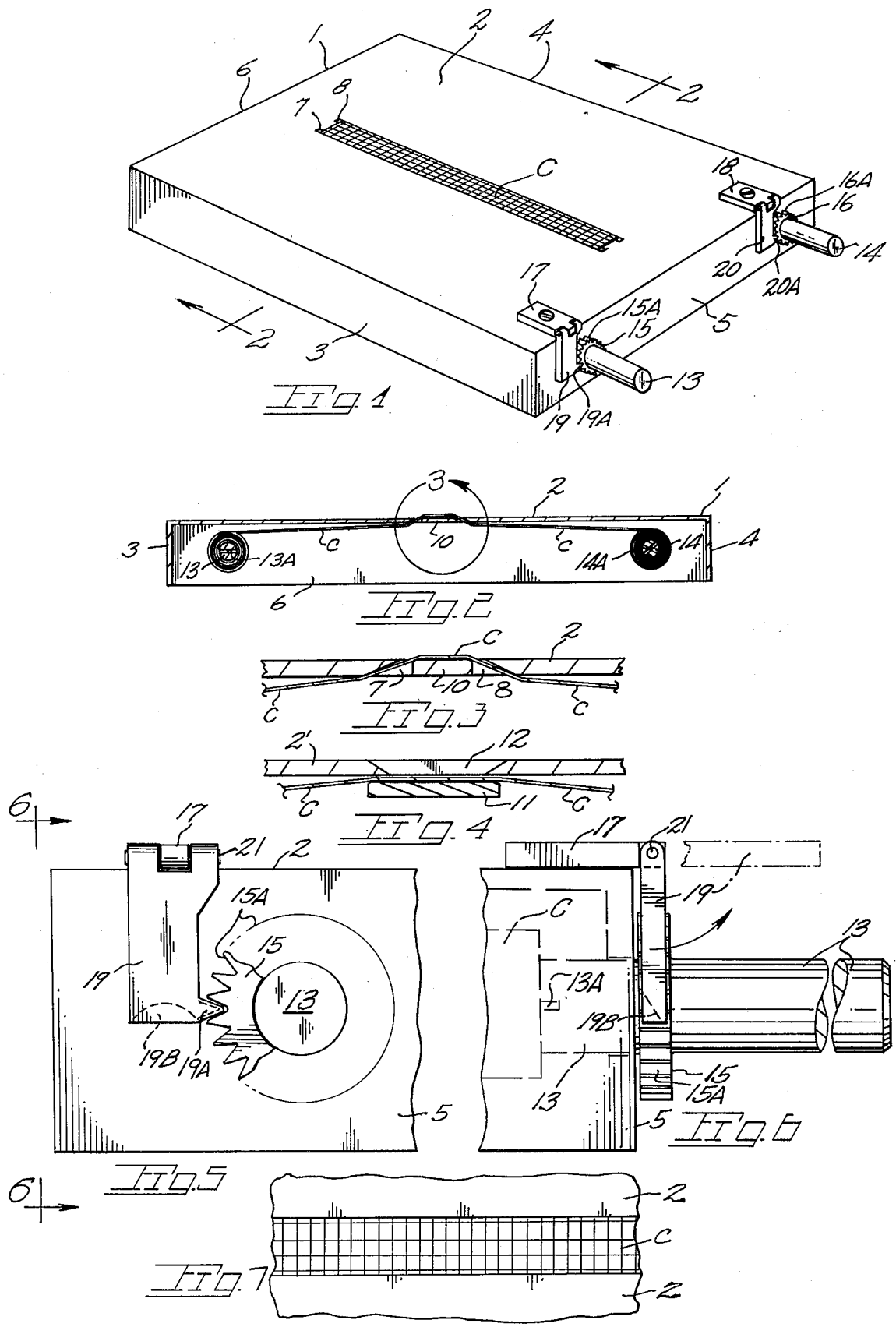

DEVICE FOR POSITIONING A PATTERN STRIP CHART

BACKGROUND OF THE INVENTION

The present invention concerns a device for use by a person doing embroidery or needlepoint work.

Embroidery or needlepoint work is commonly done in compliance with a paper chart divided into minute squares with each square coded to indicate the color of yarn to be used for the corresponding stitch to effect a specific pattern. The chart squares correspond to openings in the open or loose weave background fabric being embellished with the embroidery or needlepoint. The squares on the chart are accordingly minute and require considerable effort on the person's part to follow same in sequence. Obviously, stitches of the wrong color of yarn from inaccurate chart reading will result in an imperfect piece of work. Correction of errors made entails tedious stitch removal and new stitches made with the correct color of yarn. The use of a straight edge to follow chart progress is impractical in view of the susceptibility of the straight edge being accidentally displaced on the chart surface.

SUMMARY OF THE PRESENT INVENTION

The present invention is embodied within a device for advancing an embroidery chart or the like in a precise manner permitting the chart to be temporarily locked in place against accidental displacement.

The chart holder device comprises a main body portion within which are rotatably mounted spindles for holding and taking up a strip chart as embroidery work progresses. Locking means are provided for convenient manipulation into and out of locked engagement with the spindles to prevent undesired spindle rotation. An upper surface of the main body portion of the device receives an exposed segment of the chart to present an easy to follow row or rows of chart symbols. One convenient form of chart presentation is embodied within a top wall of the device having elongate openings through which the chart passes. To assure retention of chart positioning, the locking means provide for spindle locking at precise rotational increments.

Important objectives of the present chart reading device include the provision of chart carrying spindles with locking means provided enabling the locking of a spindle at a precise position to permit the user to accurately display that row or rows of chart symbols to be followed; the provision of locking means readily manipulated by the user into and out of engagement with chart carrying spindles; the provision of a chart reading device capable of presenting a few rows of chart symbols at a time to prevent misinterpretation thereof by a chart user which would ultimately result in an imperfect piece of work.

BRIEF DESCRIPTION OF THE DRAWING

In the accompanying drawing:

FIG. 1 is a perspective view of the present chart holder device;

FIG. 2 is a sectional elevational view taken along line 2—2 of FIG. 1;

FIG. 3 is an enlarged detailed view of that portion of the device encircled at 3 in FIG. 2;

FIG. 4 is a view similar to FIG. 3 but showing a modified form of the invention;

FIG. 5 is an enlarged fragmentary side elevational view of one end wall of the device disclosing spindle locking means;

FIG. 6 is an elevational view taken along line 6—6 of FIG. 5; and

FIG. 7 is an enlarged fragmentary view of the top wall of the device showing an exposed chart segment.

DETAILED DESCRIPTION OF THE PREFERRED EMBODIMENTS

With continuing attention to the accompanying drawing wherein applied reference numerals indicate parts similarly identified in the following description, the reference numeral 1 indicates the main body of the device which may be of box-like configuration having a top wall 2, front and rear walls 3 and 4, end walls at 5 and 6, and open on its underside.

Top wall 2 is configured so as to enable the presentation of a relatively narrow strip chart C. For example, the rows of an embroidery chart, being approximately ⅛ inch wide, may be displayed three or four at a time, which greatly assists the user in keeping track of the particular row being followed as compared to having the entire chart or a wide expanse thereof exposed to view. One form of the top wall 2 embodies elongate, transversely extending openings 7 and 8 through which the chart C is incrementally positioned. An elongate medial portion 10 of the top wall, between said openings, serves to support a portion of the chart and preferably three or four rows of chart symbols. It is to be understood that the top wall 2 may be otherwise configured to accomplish presentation of the chart segment for the above purpose. For example, the chart may be entrained over a chart support 11 (FIG. 4) effecting passage of chart immediately beneath an elongate aperture 12 providing a sight opening in top wall 2'.

To prevent inadvertent shifting of the chart, as well as precise locationing of that chart segment being followed by the user, I provide locking means engageable with chart carrying spindles located at 13 and 14, termed primary and "take-up" spindles, which are suitably journalled in end walls 5 and 6 with each spindle adapted to receive paper chart C such as within a lengthwise extending slot 13A-14A through which a chart end may be inserted prior to spindle manipulation. To prevent axial displacement of the spindles, the same may be provided with a snap ring or enlarged end at their unseen ends in FIG. 1. Members 15 and 16 on spindles 13 and 14 have irregular peripheral surfaces 15A-16A and constitute part of a spindle locking means. A remaining portion of said locking means is embodied within latch components indicated at 17 and 18 each having a two-position (FIG. 6) latching element 19 and 20 with tangs 19A-20A which may move into engagement with their respective circular member 15-16 and thereby prevent shaft rotation. For spindle release the latching elements 19 and 20 are positioned upwardly about the axis of a hinge as at 21. An undercut edge typically at 19B facilitates positioning of said latching elements. A multitude of rotational positions are accordingly provided for the finger actuated spindles 13 and 14 to enable the user to precisely position chart C so as to expose the appropriate segment.

In use, the latching elements 19 and 20 are lifted out of engagement with circular members 15 and 16 followed by spindle rotation to disclose the pertinent chart segment whereafter said elements are downwardly positioned about their respective hinge pin axes into locking engagement with circular members 15 and 16. The axis of each hinge pin 21 is offset upwardly and is perpendicular to the axis of its associated spindle. The loading and unloading of the chart C from the spindles is self-explanatory. Obviously, the present device may be utilized for the progressive display of other types of strip charts, maps and the like, etc.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A device for incremental positioning and display of an embroidery chart of the type divided into minute squares, each approximately one-eighth inch square, with each square coded to indicate the color of yarn to be used for the corresponding stitch necessary to effect a specific embroidered pattern, said device comprising, a main body including a top wall defining elongate openings through which the chart may pass for display of a chart segment on said top wall, an elongate chart support defined by said elongate openings and being of a width approximately one-half inch to display only a narrow segment of the chart bearing approximately four rows of chart symbols, spindles rotatably mounted in said main body to receive the chart, and latching elements of the two-position type pivotally mounted exteriorly on said main body, circular members carried by said spindles for engagement by said latching elements, said latching elements each including a tang engageable with one of said circular members to lock same and its spindle against rotation for purposes of retaining a chart segment displayed against accidental movement, each of said latching elements including an undercut edge to facilitate finger tip disengagement of same from a circular member.

* * * * *